US012489364B2

(12) United States Patent
Sato

(10) Patent No.: US 12,489,364 B2
(45) Date of Patent: Dec. 2, 2025

(54) CONTROL DEVICE OF POWER FACTOR CORRECTION CIRCUIT, POWER FACTOR CORRECTION CIRCUIT AND POWER SUPPLY DEVICE

(71) Applicant: ROHM CO., LTD., Kyoto (JP)

(72) Inventor: Yoshinori Sato, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 193 days.

(21) Appl. No.: 18/526,274

(22) Filed: Dec. 1, 2023

(65) Prior Publication Data

US 2024/0186891 A1 Jun. 6, 2024

(30) Foreign Application Priority Data

Dec. 5, 2022 (JP) ................................ 2022-194024

(51) Int. Cl.
*H02M 1/42* (2007.01)
*H02M 7/21* (2006.01)

(52) U.S. Cl.
CPC .......... *H02M 1/4258* (2013.01); *H02M 7/21* (2013.01)

(58) Field of Classification Search
CPC ............................ H02M 1/4258; H02M 7/21
See application file for complete search history.

(56) References Cited

U.S. PATENT DOCUMENTS 11,632,039 B2 * 4/2023 Endo .................. H02M 1/0025 363/89
2025/0030354 A1 * 1/2025 Yaguchi .................. H02M 1/12
2025/0047198 A1 * 2/2025 Araumi ................. H02M 3/156

FOREIGN PATENT DOCUMENTS

JP 2017-118767 6/2017

* cited by examiner

*Primary Examiner* — Adolf D Berhane
(74) *Attorney, Agent, or Firm* — Fish & Richardson P.C.

(57) ABSTRACT

The present disclosure provides a control device for a power factor correction circuit. The power factor correction circuit is disposed in a power supply device configured to generate a direct current output voltage from an alternating current voltage applied to a pair of power supply terminals. The power factor correction circuit is disposed between a full-wave rectifier circuit configured to generate a full-wave rectified voltage by full-wave rectifying the AC voltage and an output wiring configured to apply the output voltage. The power factor correction circuit includes an inductor inserted between the full-wave rectifier circuit and the output wiring, and a switching element configured to switch between an on state and an off state to control a current flowing through the inductor.

7 Claims, 4 Drawing Sheets

| When load decreases | | | |
|---|---|---|---|
| Switching of number of bottoms | Period of free vibration [μs] | First reference time Tupxx [μs] | Switching frequency [kHz] |
| 1 → 2 | 2.0 | 6.5 | f1≈111.1 |
| 2 → 3 | 2.0 | 7.5 | f2≈100.0 |
| 3 → 4 | 2.0 | 8.5 | f3≈90.9 |
| 4 → 5 | 2.0 | 9.5 | f4≈83.3 |
| When load increases | | | |
| Switching of number of bottoms | Period of free vibration [μs] | Second reference time Tdnxx [μs] | Switching frequency [kHz] |
| 5 → 4 | 2.0 | 9.0 | f5≈57.1 |
| 4 → 3 | 2.0 | 10.0 | f6≈60.6 |
| 3 → 2 | 2.0 | 11.5 | f7≈62.5 |
| 2 → 1 | 2.0 | 12.5 | f8≈66.7 |

CONTROL DEVICE OF POWER FACTOR CORRECTION CIRCUIT, POWER FACTOR CORRECTION CIRCUIT AND POWER SUPPLY DEVICE

TECHNICAL FIELD

The disclosure of the present application relates to a control device for a power factor correction circuit, a power factor correction circuit and a power supply device.

BACKGROUND

In a power supply device that converts an alternating current (AC) voltage to a direct current (DC) voltage, the IEC61000-3-2, which is a harmonic distortion related standard, is available for lighting apparatuses above 5 W, power supply apparatuses above 75 W and other apparatuses.

In order to improve harmonic distortion of the aforesaid apparatuses, a power factor correction circuit is used. A power supply apparatus above 75 W is, for example, a power adaptor. When a power factor correction circuit is applied in a power adaptor, it may be difficult to achieve a power specification such as Energy Star 6.0 due to power loss occurring in the power factor correction circuit.

In a power factor correction circuit, a critical mode topology (for example, referring to patent document 1) is often utilized. One reason that the critical mode topology is often used is, for example, in a critical mode power factor correction circuit, it is easy to control a turn-on time of a switching element according to the AC voltage, so that costs can be easily reduced and higher efficiency is achieved.

PRIOR ART DOCUMENT

Patent Publication

[Patent document 1] Japan Patent Publication No. 2017-118767

DETAILED DESCRIPTION OF THE EMBODIMENTS

First Embodiment

Figure 1:
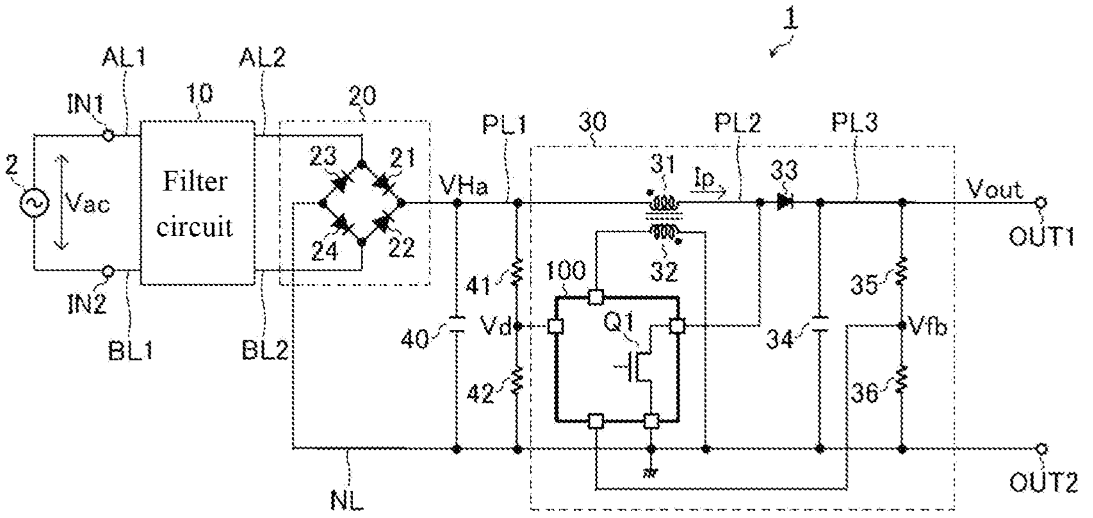
FIG. 1 is a diagram of an overall configuration of a power supply device 1 according to a first embodiment.

FIG. 1 shows a diagram of an overall configuration of a power supply device 1 according to a first embodiment. The power supply device 1 is an AC/DC converter that generates a DC output voltage Vout based on an AC voltage Vac supplied from an AC power supply 2. The AC voltage Vac is, for example, a commercial AC voltage.

The power supply device 1 includes power supply terminals IN1 an IN2 forming a pair of power supply terminals, output terminals OUT1 and OUT2 forming a pair of output terminals, a filter circuit 10, a full-wave rectifier circuit 20, a power factor correction circuit 30, a capacitor 40, and wirings (including wirings AL1, BL1, AL2, BL2, PL1, PL2, PL3 and NL described below) for connecting the elements.

The AC voltage Vac from the AC power supply 2 is supplied to the pair of power supply terminals. That is to say, the AC voltage Vac from the AC power supply 2 is applied to the power supply terminals IN1 and IN2.

The filter circuit 10 is disposed between the pair of power supply terminals and the full-wave rectifier circuit 20, and is configured to reduce noise overlapping the AC voltage Vac. The AC voltage Vac of which noise is reduced by the filter circuit 10 is applied between the wirings AL2 and BL2.

The full-wave rectifier circuit 20 generates a full-wave rectified voltage VHa by full-wave rectifying the AC voltage Vac of which noise is going to be reduced by the filter circuit 10. The full-wave rectifier circuit 20 is a diode bridge circuit including four diodes 21 to 24. More specifically, an anode of the diode 21 and a cathode of the diode 23 are commonly connected to the wiring AL2, an anode of the diode 22 and a cathode of the diode 24 are commonly connected to the wiring BL2, cathodes of the diodes 21 and 22 are commonly connected to the wiring PL1, and anodes of the diodes 23 and 24 are commonly connected to the wiring NL.

The full-wave rectified voltage VHa is applied between the wirings NL and PL1. At this point in time, a negative-side potential is applied to the wiring NL, and a positive-side potential is applied to the wiring PL1. The capacitor 40 is connected to the wirings PL1 and NL.

A voltage divider circuit including voltage divider resistors 41 and 42 divides the full-wave rectified voltage VHa. More specifically, a first end of the voltage divider resistor 41 is connected to the wiring PL1, and a second end of the voltage divider resistor 41 is connected to the wiring NL via the voltage divider resistor 42. A divided voltage Vd of the full-wave rectified voltage VHa is generated at a connection node between the voltage divider resistors 41 and 42. The divided voltage Vd of the full-wave rectified voltage VHa is supplied to a control device 100 described below.

The power factor correction circuit 30 is a boost converter that generates the output voltage Vout from the full-wave rectified voltage VHa, and improves a power factor of the power supply device 1 by means of operating in a manner that a phase of the AC voltage Vac is consistent with a phase of an AC current output from an AC power supply. The power factor correction circuit 30 includes inductors 31 and 32, a switching element Q1 formed by an N-channel metal-oxide-semiconductor field-effect transistor (MOSFET), a backflow diode 33, a smoothing capacitor 34, voltage divider resistors 35 and 36, and the control device 100.

In this embodiment, the switching element Q1 is a GaN semiconductor element. When the switching element Q1 is implemented by a GaN semiconductor element, the switching element Q1 can be disposed in the control device 100 since heat generated in the switching element Q1 can be reduced. Thus, in this embodiment, the control device 100 includes the switching element Q1. Moreover, different from this embodiment, the switching element Q1 can also be externally connected to the control device 100. When the switching element Q1 is externally connected to the control device 100, the switching element Q1 may be a GaN semiconductor element or a silicon semiconductor element.

One end of the inductor 31 is connected to the wiring PL1, and is connected to the cathodes of the diodes 21 and 22 via the wiring PL1. The other end of the inductor 31 is connected to the wiring PL2, and is commonly connected to a drain of the switching element Q1 and an anode of the backflow diode 33 via the wiring PL2. A source of the switch element Q1 is connected to the wiring NL applied with a ground potential.

A cathode of the backflow diode 33 is connected to the wiring PL3. The wiring PL3 is an output wiring applied with the output voltage Vout. The output voltage Vout is a voltage observed from a ground potential, and has a level higher than that of the ground potential. Moreover, different from this embodiment, a synchronous rectifier transistor may also be used in substitution for the backflow diode 33 as a backflow element. In this case, under the control of the control device 100, when the switching element Q1 is in an on state, the synchronous rectifier transistor is set to be in an off state, and when the switching element Q1 is in an off state, the synchronous rectifier transistor is set to be in an on state.

A first end of the smoothing capacitor 34 is connected to the wiring PL3. A second end of the smoothing capacitor 34 is connected to the wiring NL. The output voltage Vout is divided by a voltage divider circuit including the voltage divider resistors 35 and 36 to generate a feedback voltage Vfb. More specifically, a first end of the voltage divider resistor 35 is connected to the wiring PL3, and a second end of the voltage divider resistor 35 is connected to the wiring NL via the voltage divider resistor 36. The feedback voltage Vfb is generated at a connection node between the voltage divider resistors 35 and 36. The feedback voltage Vfb is supplied to the control device 100. The output terminal OUT1 is connected to the wiring PL3, and the output terminal OUT2 is connected to the wiring NL.

The inductor 32 is magnetically coupled to the inductor 31. The inductor 32 generates a voltage corresponding to a current Ip (hereinafter referred to as an inductor current Ip) flowing through the inductor L1. The voltage corresponding to the inductor current Ip is supplied to the control device 100.

Figure 2:
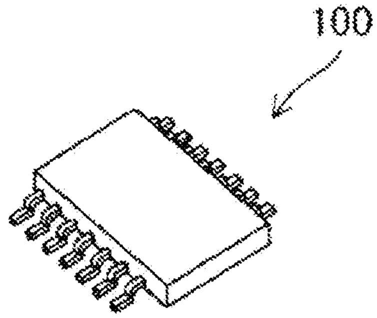
FIG. 2 is a perspective diagram of an appearance of a control device.

The control device 100 is an electronic component (semiconductor device) formed by means of packaging a semiconductor integrated circuit into a housing (package) formed of resin, as shown in FIG. 2. Multiple external terminals are exposed from a housing of the control device 100. These multiple external terminals may include the terminals shown in FIG. 1, and may include terminals other than those shown in FIG. 1. Moreover, the number of the external terminals of the control device 100 and the appearance of the control device 100 shown in FIG. 2 are merely examples.

The control device 100 performs an output stabilization control for stabilizing the output voltage Vout at a specified target voltage, and a power factor correction control for increasing the power factor of the power supply device 1 by means of adjusting the inductor current Ip.

The output stabilization control and the power factor correction control are implemented by means of controlling a state (an on/off state) of the switching element Q1. The control device 100 supplies a gate signal to the switching element Q1, and switches the gate signal between a high level and a low level to cause the switching element Q1 to perform switching. The switching element Q1 is in an on state when the gate signal is at a high level, and the switching element Q1 is in an off state when the gate signal is at a low level.

During a period when the switching element Q1 is turned on, the inductor current Ip flows through the switching element Q1 to the wiring NL. During a period when the switching element Q1 is turned off, when an inductor current IL flows (when the inductor 31 stores energy), the inductor current IL flows through the backflow diode 33 to the wiring PL3.

When a load that receives the output voltage Vout is a light load, that is, when the output power of the power factor correction circuit 30 is under a predetermined value, the control device 100 operates in a critical mode (boundary-conduction mode). Moreover, when the load that receives the output voltage Vout is not a light load, the control device 100 may operate in a critical mode, or may operate in a continuous mode (continuous-conduction mode).

Figure 3:
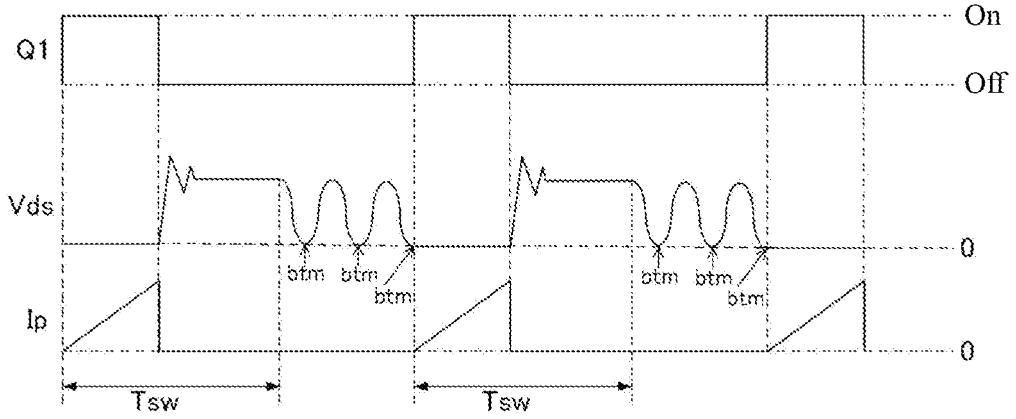
FIG. 3 is a diagram of exemplary waveforms of a drain-source voltage and an inductor current of a switching element in a critical mode.

FIG. 3 shows a diagram of exemplary waveforms of a drain-source voltage Vds and the inductor current Ip of the switching element Q1 in a critical mode. Moreover, the state (the on/off state) of the switching element Q1 is also depicted in FIG. 3. In the example shown in FIG. 3, in each switching period, the number of bottoms btm in a free vibration of the drain-source voltage Vds of the switching element Q1 is three.

When the load that receives the output voltage Vout is a light load, during a period when the switching element Q1 is turned off, the control device 100 controls the number of bottoms in a free vibration of the drain-source voltage Vds of the switching element Q1 based on a period Tsw from a turn-on of the switching element Q1 to a start of the free vibration of the drain-source voltage Vds of the switching element Q1.

More specifically, during the period when the switching element Q1 is turned off, the control device 100 controls the number of bottoms in a free vibration of the drain-source voltage Vds of the switching element Q1 to increase as the period Tsw from the turn-on of the switching element Q1 to the start of the free vibration of the drain-source voltage Vds of the switching element Q1 gets shorter. For example, when the period Tsw is longer than 8.5 μs, the control device 100 sets the number of bottoms to one. For example, when the period Tsw is less than 8.5 μs and longer than 7.5 μs, the control device 100 sets the number of bottoms to two. Moreover, when the period Tsw is less than 7.5 μs and longer than 6.5 μs, the control device 100 sets the number of bottoms to three. Moreover, when the period Tsw is less than 6.5 μs and longer than 5.5 μs, the control device 100 sets the number of bottoms to four. In addition, when the period Tsw is less than 5.5 μs, the control device 100 sets the number of bottoms to five.

With the control of the control device 100, the switching frequency of the switching element Q1 can be reduced when a load that receives the output voltage Vout is a light load.

Second Embodiment

In comparison with the power supply device 1 of the first embodiment, the power supply device 1 of the second embodiment has different specific control details of the control device 100 from those of the first embodiment, but the rest are the same as those of the power supply device 1 of the first embodiment.

In this embodiment, similar to the first embodiment, when the load that receives the output voltage Vout is a light load, during a period when the switching element Q1 is turned off, the control device 100 controls the number of bottoms in a free vibration of the drain-source voltage of the switching element Q1 based on the period Tsw from the turn-on of the switching element Q1 to the start of the free vibration.

In the first embodiment, the number of bottoms increases as the period Tsw gets shorter. Thus, according to the load that receives the output voltage Vout, the switching frequency of the switching element Q1 changes, and a peak value of the inductor current also changes. As a result, when charge of the load that receives the output voltage Vout varies greatly, total harmonic distortion (THD) is aggravated.

The power supply device 1 of this embodiment suppresses the THD from aggravating by means of preventing the number of bottoms from varying greatly.

Figure 4:
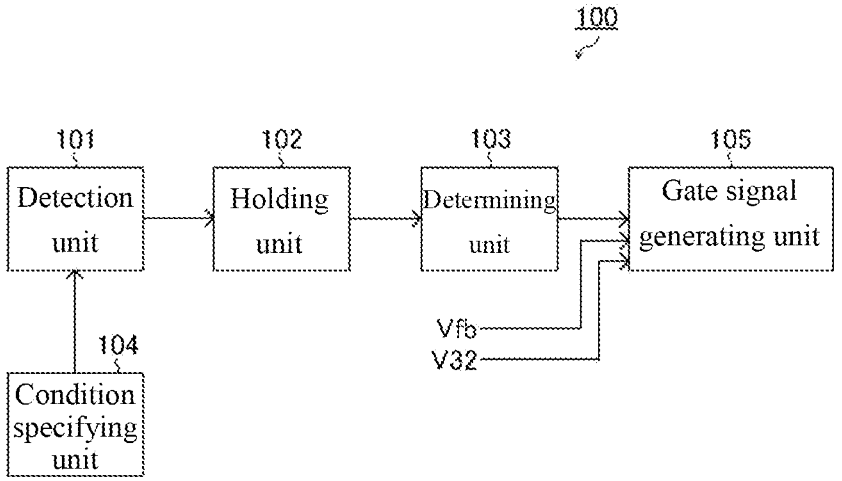
FIG. 4 is a diagram of a brief configuration of a control device according to a second embodiment.

FIG. 4 shows a diagram of a brief configuration of the control device 100 according to this embodiment. The control device 100 of this embodiment includes a detection unit 101, a holding unit 102, a determining unit 103, a condition specifying unit 104 and a gate signal generating unit 105.

The detection unit 101 obtains a correlation value correlated with the period Tsw from the turn-on of the switching element Q1 to the start of the free vibration of the drain-source voltage Vds of the switching element Q1. More specifically, the detection unit 101 obtains the correlation value that correlates with a minimum value of the period Tsw from the turn-on of the switching element Q1 to the start of the free vibration of the drain-source voltage Vds of the switching element Q1 in a predetermined period.

For example, a maximum value of the period Tsw from the turn-on of the switching element Q1 to the start of the free vibration of the drain-source voltage Vds of the switching element Q1 in a predetermined period is used in substitution for a minimum value of the period Tsw from the turn-on of the switching element Q1 to the start of the free vibration of the drain-source voltage Vds of the switching element Q1 in the predetermined period.

Moreover, a value proportional to a minimum value of the period Tsw from the turn-on of the switching element Q1 to the start of the free vibration of the drain-source voltage Vds of the switching element Q1 in a predetermined period can also be used in substitution for a minimum value of the period Tsw from the turn-on of the switching element Q1 to the start of the free vibration of the drain-source voltage Vds of the switching element Q1 in the predetermined period.

Moreover, a value proportional to a maximum value of the period Tsw from the turn-on of the switching element Q1 to the start of the free vibration of the drain-source voltage Vds of the switching element Q1 in a predetermined period can also be used in substitution for a minimum value of the period Tsw from the turn-on of the switching element Q1 to the start of the free vibration of the drain-source voltage Vds of the switching element Q1 in the predetermined period.

It is desired that the predetermined period is one cycle of the full-wave rectified voltage VHa. If the predetermined period is one cycle of the full-wave rectified voltage VHa, the switching frequency of the switching element Q1 does not change within one cycle of the full-wave rectified voltage VHa, hence boosting the effect of suppressing the THD from aggravating.

The holding unit 102 holds the correlation value obtained by the detection unit 101.

The determining unit 103 determines, based on the correlation value held by the holding unit 102, whether to increase the number of bottoms by a first predetermined value, keep the number of bottoms unchanged or decrease the number of bottoms by a second predetermined value.

If the load that receives the output voltage Vout gets lighter, the period Tsw from the turn-on of the switching element Q1 to the start of the free vibration of the drain-source voltage Vds of the switching element Q1 gets shorter. Thus, if the minimum value of the period Tsw from the turn-on of the switching element Q1 to the start of the free vibration of the drain-source voltage Vds of the switching element Q1 in the predetermined period is shorter than a first reference time Tupxx, the determining unit 103 increases the number of bottoms by the first predetermined value. The first predetermined value is a natural number, and is desired to be 1. The reasons for the above is that, if the first predetermined value is 1, the change in the increase in the number of bottoms can be suppressed to be within a minimum range, hence boosting the effect of suppressing the THD from aggravating.

On the other hand, if the load that receives the output voltage Vout gets heavier, the period Tsw from the turn-on of the switching element Q1 to the start of the free vibration of the drain-source voltage Vds of the switching element Q1 gets longer. Thus, if the minimum value of the period Tsw from the turn-on of the switching element Q1 to the start of the free vibration of the drain-source voltage Vds of the switching element Q1 in the predetermined period is longer than a second reference time Tdnxx, the determining unit 103 decreases the number of bottoms by the second predetermined value. The second predetermined value is a natural number, and is desired to be 1. The reasons for the above is that, if the second predetermined value is 1, the change in the decrease in the number of bottoms can be suppressed to be within a minimum range, hence boosting the effect of suppressing the THD from aggravating.

Moreover, if the minimum value of the period Tsw from the turn-on of the switching element Q1 to the start of the free vibration of the drain-source voltage Vds of the switching element Q1 in the predetermined period is between the first reference time Tupxx and the second reference time Tdnxx, the determining unit 103 keeps the number of bottoms unchanged.

Figures 5, 6:
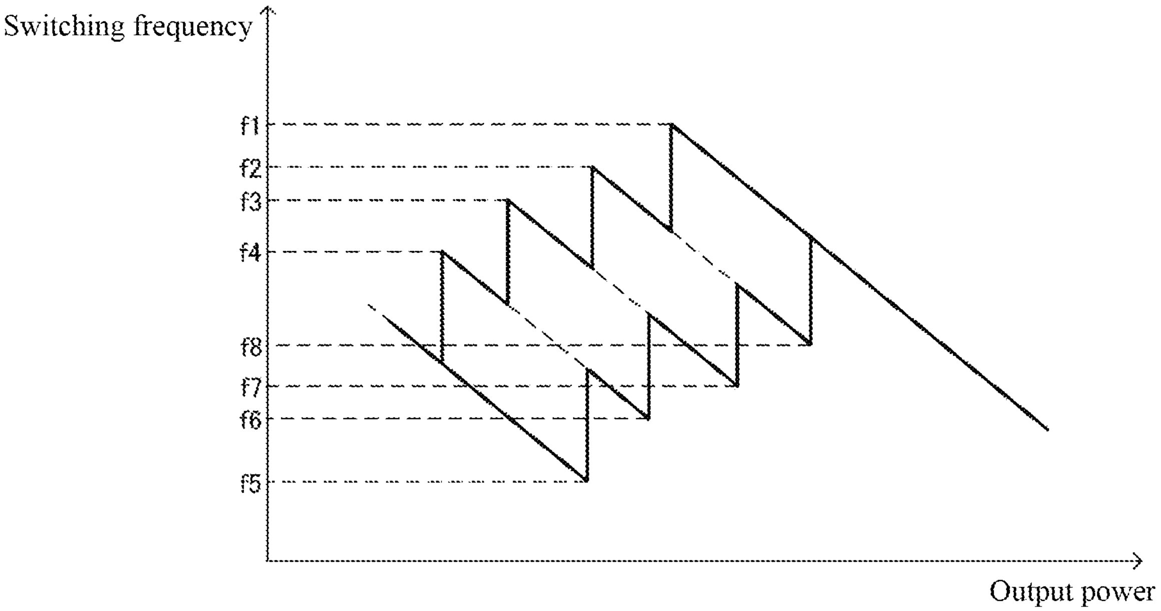
FIG. 5 is a diagram of setting examples of a first reference time and a second reference time.
FIG. 6 is a diagram of a relation between an output power of a power factor correction circuit and a switching frequency of a switching element in the setting examples in FIG. 5.

FIG. 5 shows a diagram of setting examples of the first reference time Tupxx and the second reference time Tdnxx. FIG. 6 shows a diagram of a relation between the output power of the power factor correction circuit 30 and the switching frequency of the switching element Q1 in the setting examples in FIG. 5. It is learned from FIG. 6 that, since the power supply device 1 of this embodiment prevents the switching frequency of the switching element Q1 from varying greatly, the THD can be suppressed from aggravating.

Figure 7:
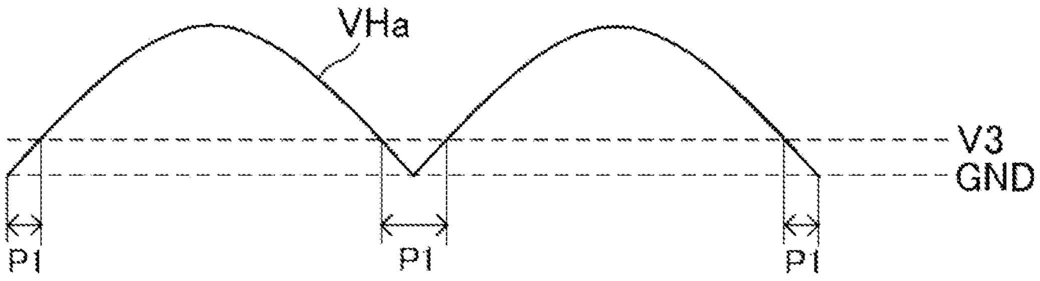
FIG. 7 is a diagram of a waveform of a full-wave rectified voltage.

The condition specifying unit 104, when the full-wave rectified voltage VHa is less than a third predetermined value V3, that is, during a period P1 shown in FIG. 7, disables detection of the detection unit 101.

When the full-wave rectified voltage VHa is small, the period in which the switching element Q1 is on becomes longer. Thus, regardless of how the load that receives the output voltage Vout is, the issue that the number of bottoms falling at a maximum value inevitably occurs. With the condition specifying unit 104 of the control device 100, the issue above is prevented.

The gate signal generating unit 105 generates a gate signal based on the feedback voltage Vfb, a voltage V32 supplied from the inductor 32 and the output from the determining unit 103.

Figure 8:
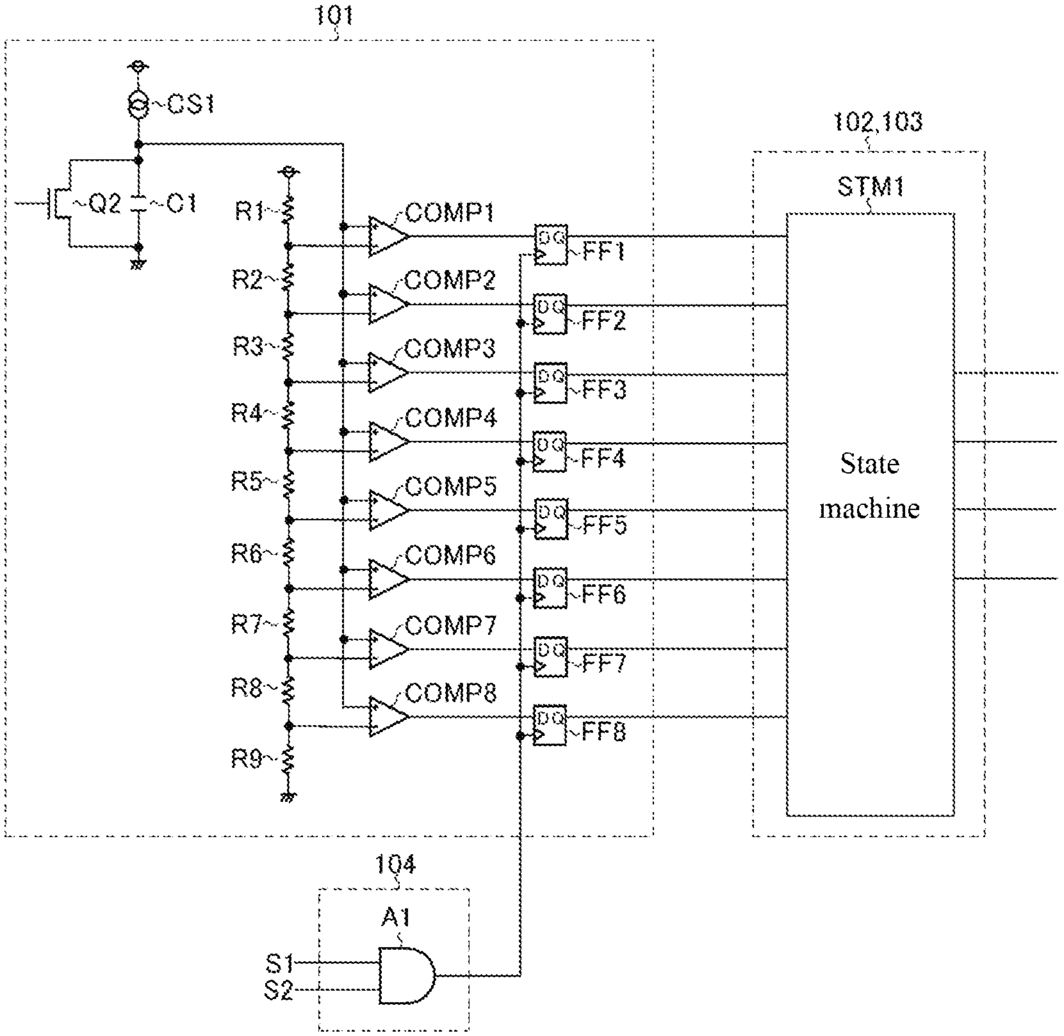
FIG. 8 is a diagram of a configuration example of a detection unit, a holding unit, a determining unit and a condition specifying unit.

FIG. 8 shows a diagram of a configuration example of the detection unit 101, the holding unit 102, the determining unit 103 and the condition specifying unit 104.

The detection unit 101 includes a current source CS1 outputting a constant current, a capacitor C1, a transistor Q2 which is a discharge switch, resistors R1 to R9, comparators COMP1 to COMP8, and flip-flops FF1 to FF8.

The capacitor C1 is charged in each period Tsw. A charging voltage of the capacitor C1 is compared in each of the comparators COMP1 to COMP8 with different reference voltages generated by the resistors R1 to R9. The respective outputs of the comparators COMP1 to COMP8 are held by the flip-flops FF1 to FF8.

The flip-flops FF1 to FF8 basically update time data according to each switching cycle of the switching element Q1. A signal S1 is a signal corresponding to the switching cycle of the switching element Q1.

The holding unit 102 and the determining unit 103 include a state machine STM1. The state machine STM1 selects a matching signal of the flip-flops FF1 to FF8 according to a current state (the number of bottoms), and compares a length of the period Tsw with the reference time corresponding to the current state (the number of bottoms). Moreover, the state machine STM1 determines to which of the three states including being longer and shorter relative to the reference time, and between the two reference times the comparison time corresponds, and updates a state used for determining the next period Tsw according to a determination result.

The condition specifying unit 104 includes an AND gate A1. The AND gate A1 is a logical sum of the output signal S1 and a signal S2. The signal S2 is a signal that changes to a high level when the full-wave rectified voltage VHa is less than the third predetermined value V3.

<Note>

A note is attached to the present disclosure to show specific configuration examples of the embodiments above.

A control device (100) of the present disclosure is configured as (a first configuration), a control device for a power factor correction circuit (30) disposed in a power supply device (1) configured to generate a direct current (DC) output voltage from an alternating current (AC) voltage applied to a pair of power supply terminals (IN1, IN2), the power factor correction circuit, disposed between a full-wave rectifier circuit (20) configured to generate a full-wave rectified voltage by full-wave rectifying the AC voltage and an output wiring (PL3) configured to apply the output voltage, and including an inductor (31) inserted between the full-wave rectifier circuit and the output wiring, and a switching element (Q1) configured to switch between an on state and an off state to control a current flowing through the inductor, wherein the control device is configured to, during a period when the switching element is turned off, control a number of bottoms in a free vibration of a voltage between a first end and a second end of the switching element based on a period from a turn-on of the switching element to a start of the free vibration.

The control device according to the first configuration can also be configured as (a second configuration), comprising:

a detection unit (101), configured to obtain a correlation value correlated with the period from the turn-on of the switching element to the start of the free vibration;

a holding unit (102), configured to hold the correlation value;

a determining unit (103), configured to determine, based on the correlation value held by the holding unit, whether to increase the number of bottoms by a first predetermined value, keep the number of bottoms unchanged or decrease the number of bottoms by a second predetermined value; and a condition specifying unit (104), configured to disable detection of the detection unit when the full-wave rectified voltage is less than a third predetermined value.

The control device according to the second configuration can also be configured as (a third configuration), wherein the correlation value is a value that correlates with a minimum value of the period from the turn-on of the switching element to the start of the free vibration in a predetermined period.

The control device according to the third configuration can also be configured as (a fourth configuration), wherein the predetermined period is one cycle of the full-wave rectified voltage.

The control device according to any one of the first to fourth configurations can also be configured as (a fifth configuration), further comprising: the switching element, which is a GaN semiconductor element.

A power factor correction circuit (30) of the present disclosure is configured as (a sixth configuration), comprising:

the control device of any one of the first to fifth configurations;

the inductor; and the switching element built in or externally connected to the control device.

A power supply device (1) of the present disclosure is configured as (a seventh configuration), comprising:

the power factor correction circuit of the sixth configuration;

the full-wave rectifier circuit; and the output wiring.

The invention claimed is:

1. A control device, for a power factor correction circuit disposed in a power supply device configured to generate a DC output voltage from an AC voltage applied to a pair of power supply terminals, the power factor correction circuit, disposed between a full-wave rectifier circuit configured to generate a full-wave rectified voltage by full-wave rectifying an alternating current voltage and an output wiring configured to apply the output voltage, and including:

an inductor inserted between the full-wave rectifier circuit and the output wiring; and a switching element configured to switch between an on state and an off state to control a current flowing through the inductor, the control device is configured to, during a period when the switching element is turned off, control a number of bottoms in a free vibration of a voltage between a first end and a second end of the switching element based on a period from a turn-on of the switching element to a start of the free vibration.

2. The control device of claim 1, comprising:

a detection unit, configured to obtain a correlation value correlated with the period from the turn-on of the switching element to the start of the free vibration;

a holding unit, configured to hold the correlation value;

a determining unit, configured to determine whether to increase the number of bottoms by a first predetermined value, keep the number of bottoms unchanged or decrease the number of bottoms by a second predetermined value based on the correlation value held by the holding unit; and a condition specifying unit, configured to disable detection of the detection unit when the full-wave rectified voltage is less than a third predetermined value.

3. The control device of claim 2, wherein the correlation value is a value that correlates with a minimum value of the period from the turn-on of the switching element to the start of the free vibration in a predetermined period.

4. The control device of claim 3, wherein the predetermined period is one cycle of the full-wave rectified voltage.

5. The control device of claim 1, further comprising:

the switching element, which is a GaN semiconductor element.

6. A power factor correction circuit, comprising:

the control device of claim 1;

the inductor; and the switching element built in or externally connected to the control device.

7. A power supply device, comprising:

the power factor correction circuit of claim 6;

the full-wave rectifier circuit; and the output wiring.

* * * * *